(12) United States Patent
Oota

(10) Patent No.: US 7,412,713 B2
(45) Date of Patent: Aug. 12, 2008

(54) CHUCKING APPARATUS

(75) Inventor: Hidehiko Oota, Ehime (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 192 days.

(21) Appl. No.: 10/591,615

(22) PCT Filed: Nov. 16, 2004

(86) PCT No.: PCT/JP2004/017326

§ 371 (c)(1),
(2), (4) Date: Sep. 5, 2006

(87) PCT Pub. No.: WO2005/086155

PCT Pub. Date: Sep. 15, 2005

(65) Prior Publication Data

US 2007/0192779 A1    Aug. 16, 2007

(30) Foreign Application Priority Data

Mar. 4, 2004    (JP)    ............... 2004-061014
Mar. 4, 2004    (JP)    ............... 2004-061018
Mar. 4, 2004    (JP)    ............... 2004-061022

(51) Int. Cl.
G11B 17/028    (2006.01)

(52) U.S. Cl. .................................... 720/707

(58) Field of Classification Search ................ 720/707, 720/709, 617, 619; 360/98.08, 99.05, 99.12; 369/271
See application file for complete search history.

(56) References Cited

U.S. PATENT DOCUMENTS

| | | | | | |
|---|---|---|---|---|---|
| 4,562,570 | A | * | 12/1985 | Denton | 720/709 |
| 5,872,681 | A | * | 2/1999 | Boutaghou | 360/99.12 |
| 6,041,033 | A | * | 3/2000 | Otsubo et al. | 720/707 |
| 6,208,613 | B1 | * | 3/2001 | Iizuka | 720/707 |
| 6,611,490 | B1 | * | 8/2003 | Bierhoff | 720/707 |
| 2002/0176352 | A1 | * | 11/2002 | Konno et al. | 369/271 |

FOREIGN PATENT DOCUMENTS

| | | |
|---|---|---|
| JP | 8-287568 | 11/1996 |
| JP | 11-306628 | 11/1999 |
| JP | 2000-67497 | 3/2000 |
| JP | 2000-149363 | 5/2000 |
| JP | 2003-16710 | 1/2003 |

* cited by examiner

Primary Examiner—Tianjie Chen
(74) Attorney, Agent, or Firm—Dickinson Wright, PLLC.

(57) ABSTRACT

A chucking apparatus in which a plurality of pawl bodies are provided in a radial direction of a hub body of a turntable such that the pawl bodies can move, a center hole of a disk is pressed by the pawl bodies to hold the disk, wherein the chucking apparatus comprises a resilient member for biasing the pawl bodies outward of the hub body, each of the pawl bodies includes a pawl portion which comes into contact with the disk, and a pawl-side stopper for limiting outward movement caused by the resilient member, the hub body includes a pawl opening through which the pawl portion can project outward, and a hub-side stopper which abuts against the pawl-side stopper, a position of the pawl portion in a standby state where the disk is not held by the pawl portion is set lower than a position of the pawl portion in a recording/replaying state where the disk is held by the pawl portion.

15 Claims, 19 Drawing Sheets

CHUCKING APPARATUS

TECHNICAL FIELD

The present invention relates to a chucking apparatus suitable for a disk apparatus which records or replays into or from a disk-like recording medium such as a CD and a DVD, and more particularly, to a so-called slot-in type disk apparatus capable of directly inserting or discharging a disk from or to outside.

BACKGROUND TECHNIQUE

A loading method is widely employed in conventional disk apparatuses. In this method, a disk is placed on a tray or a turntable, and the tray or the turntable is loaded into an apparatus body.

According to such a loading method, however, since the tray or the turntable is required, there is a limit for thinning the disk apparatus body.

As a slot-in type disk apparatus, there is proposed a method which a conveying roller is abutted against a disk surface to pull the disk in (e.g., a patent document 1).

(Patent document 1)

Japanese Patent Application Laid-open No.H7-220353

According to the slot-in type as proposed in the patent document 1, however, since a conveying roller which is longer than a diameter of the disk is used, the width of the apparatus must be increased, and the thickness of the apparatus is also increased due to this conveying roller.

Therefore, according to such a slot-in type disk apparatus, it is difficult to reduce the thickness and size of the disk apparatus body.

Hence, it is an object of the present invention to provide a chucking apparatus which can be reduced in thickness and size.

Especially, for reducing the height space above the turn table required for inserting a disk in a standby state where no disk is inserted into the disk apparatus, it is another object of the invention to provide a chucking apparatus which can be reduced in thickness.

DISCLOSURE OF THE INVENTION

A first aspect of the present invention provides a chucking apparatus in which a plurality of pawl bodies are provided in a radial direction of a hub body of a turntable such that the pawl bodies can move, a center hole of a disk is pressed by the pawl bodies to hold the disk, wherein the chucking apparatus comprises a resilient member for biasing the pawl bodies outward of the hub body, each of the pawl bodies includes a pawl portion which comes into contact with the disk, and a pawl-side stopper for limiting outward movement of said pawl bodies caused by the resilient member, the hub body includes a pawl opening through which the pawl portion can project outward, and a hub-side stopper which abuts against the pawl-side stopper, and a position of the pawl portion in a standby state where the disk is not held by the pawl portion is set lower than a position of the pawl portion in a recording/replaying state where the disk is held by the pawl portion.

With this aspect, the height space above the turntable required for inserting the disk in the standby state where the disk is not inserted can be reduced and thus, the thickness of the disk apparatus can be reduced.

According to a second aspect, in the chucking apparatus of the first aspect, a coil spring is used as the resilient member, and an abutment position between the pawl-side stopper and the hub-side stopper is lower than a center line of the coil spring.

With this aspect, in the standby state where the disk is not held by the pawl portion, the coil spring can be biased such that the tip end of the pawl portion is oriented downward.

According to a third aspect, in the chucking apparatus of the second aspect, the abutment position between the pawl-side stopper and the hub-side stopper is provided on an inner side than the pawl portion.

With this aspect, since the abutment position between the pawl-side stopper and the hub-side stopper is provided on the inner side than the pawl portion, an obstruction outside from the pawl portion is eliminated, and the pawl portion can sufficiently be lowered. It is possible to reduce that amount of the position of the pawl portion in the standby state where the disk is not held by the pawl portion which projects frontward than the pawl portion position in the recording/replaying state where the disk is held by the pawl portion, and it is possible to make it easy to move the pawl body into the hub body at the time of insertion of the disk.

According to a fourth aspect, in the chucking apparatus of the second aspect, the pawl-side stopper is provided on a side of the pawl portion.

With this aspect, the height of the pawl portion can be reduced as compared with a case where the pawl-side stopper is provided below the pawl portion.

According to a fifth aspect, in the chucking apparatus of the first aspect, a position of the pawl portion in a standby state where the disk is not held by the pawl portion is equal to or lower than a height of an upper surface of the hub.

With this aspect, it is possible to reduce the height space above the turntable required for inserting the disk without depending upon the height of the pawl portion.

According to a sixth aspect, in the chucking apparatus of the first aspect, a position of the pawl portion in a recording/replaying state where the disk is held by the pawl portion is higher than a height of an upper surface of the hub.

With this aspect, even if the height space above the turntable required for inserting the disk is reduced, it is possible to reliably carry out the chucking operation of the disk.

According to a seventh aspect, in the chucking apparatus of the first aspect, the pawl portion is moved outward and a position of the pawl portion becomes lower in a case where a thickness of the disk is thin in a recording/replaying state where the disk is held by the pawl portion, as compared with a case where the disk is thick.

With this aspect, the height of the pawl can be suppressed to a low level even if the moving stroke of the hub body of the pawl body is increased in the radial direction in correspondence with the variation of the disk thickness. The height space above the turntable required for inserting the disk in the standby state where the disk is not inserted into the disk apparatus can be reduced. A height of the pawl jumping out upward from the upper surface of the held disk can be reduced in the recording/replaying state where the disk is held by the pawl portion. Thus, the thickness of the disk apparatus can be reduced.

According to an eighth aspect, in the chucking apparatus of the seventh aspect, an upward guide surface provided on a tip end side of the pawl portion and a downward receiving surface of the hub body provided at a position opposed to the upward guide surface are inclined such that their tip end sides are lower.

With this aspect, the length of the disk pressing surface of the pawl body can be reduced and the pawl height can be suppressed to a low level.

A ninth aspect of the invention provides a chucking apparatus in which a plurality of pawl bodies are provided in a radial direction of a hub body of a turntable such that the pawl bodies can move, a center hole of a disk is pressed by the pawl bodies to hold the disk, wherein the chucking apparatus comprises a resilient member for biasing the pawl bodies outward of the hub body, each of the pawl bodies includes a pawl portion which comes into contact with the disk, and a pawl-side stopper for limiting outward movement of said pawl bodies caused by the resilient member, the hub body includes a pawl opening through which the pawl portion can project outward, and a hub-side stopper which abuts against the pawl-side stopper, the pawl-side stopper which limits outward movement of the pawl body caused by the resilient member is provided closer to a tip end as compared with a contact portion between said pawl-side stopper and a lower end of the pawl body of a lower part in a standby state where the disk is not held by the pawl portion, and the hub-side stopper which abuts against the pawl-side stopper has an inclined surface whose lower side is close to a tip end side.

With this aspect, the tip end of the pawl body in the standby state can be lowered, and the height space above the turntable required for inserting the disk can be reduced.

According to a tenth aspect, in the chucking apparatus of the seventh aspect, a downward guide surface is provided at a position lower than a tip end of the pawl portion, the hub body is provided with an upper receiving surface at a position opposed to the downward guide surface, if the pawl portion is pressed from above by the disk, the downward guide surface comprises at least a first inclined surface and a second inclined surface, the first inclined surface is a surface against which the upper receiving surface abuts when a tip end of the pawl portion is inserted into a center hole of the disk or before the tip end of the pawl portion is inserted into the center hole of the disk, the second inclined surface is a surface against which the upper receiving surface abuts after the tip end of the pawl portion is inserted into the center hole of the disk, an angle formed between the second inclined surface and a pressing direction is smaller than an angle formed between the first inclined surface and the pressing direction, and the downward guide surface slides along the upper receiving surface and the pawl portion moves inward by pressing the pawl portion from above.

With this aspect, a load variation can be absorbed, and stable operation can be carried out.

According to an eleventh aspect, in the chucking apparatus of the seventh aspect, a coil spring is used as the resilient member, an abutment position between the pawl-side stopper and the hub-side stopper is lower than a center line of the coil spring and is provided on the inner side than the pawl portion.

With this aspect, the coil spring can be biased such that the tip end of the pawl portion is oriented downward.

According to a twelfth aspect, in the chucking apparatus of the first aspect, a lower end surface of the pawl body is of an arc shape.

With this aspect, the upward motion of the tip end of the pawl portion can stably be carried out.

According to a thirteenth aspect, in the chucking apparatus of the first aspect, an upper surface of the pawl portion in a recording/replaying state where the disk is held by the pawl portion is inclined such that a tip end side of the upper surface is higher with respect to a surface of the disk than the upper surface of the pawl portion in its standby state.

With this aspect, the height space above the turntable required for inserting the disk can be reduced, and the chucking operation of the disk can reliably be carried out.

According to a fourteenth aspect, in the chucking apparatus of the thirteenth aspect, a tapered surface is provided on an inner side of the upper surface of the pawl portion, the tapered surface is inclined such that an inner side thereof is lower than a tip end side surface of the upper surface of the pawl portion, and the tapered surface is inclined such that its inner side is lower than a surface of the disk in the recording/replaying state where the disk is held by the pawl portion.

With this aspect, the pawl height at the time of the chucking operation can be secured by the tapered surface, and even if the pawl height is reduced, the chucking operation can reliably be carried out.

A disk apparatus of the fifteenth aspect of the invention uses the chucking apparatus of one of the first to fourteenth aspects, the disk apparatus comprises a chassis outer sheath including a base body and a lid, a front surface of the chassis outer sheath is formed with a disk inserting opening in which a disk is directly inserted, a traverse provided on the base body holds a spindle motor and a pickup, an upper surface of the spindle motor includes the turntable, and the traverse is moved toward and away from the base body.

With this aspect, the height space above the turntable required for inserting the disk in the standby state where the disk is not inserted into the disk apparatus can be reduced. Therefore, this disk apparatus is suitable for a so-called slot-in disk apparatus in which the disk can directly be inserted from outside and can directly be discharged.

BEST MODE FOR CARRYING OUT THE INVENTION

A chucking apparatus according to an embodiment of the present invention will be explained.

First, a hub body constituting the chucking apparatus of the embodiment will be explained.

Figure 1:
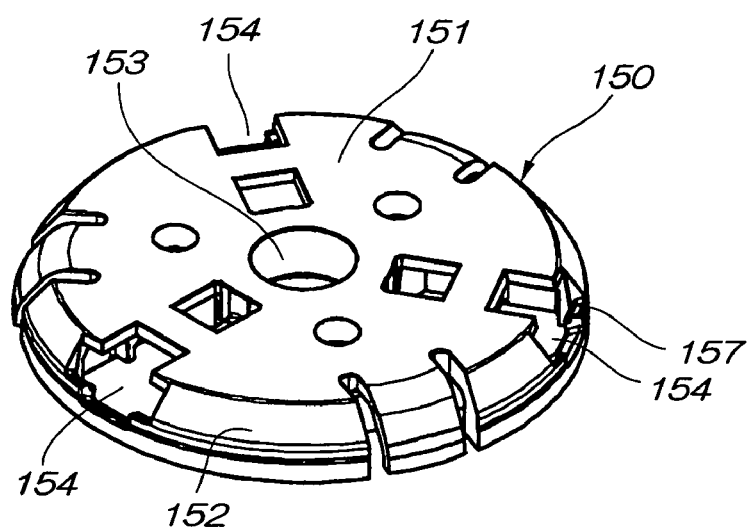
FIG. 1 is a perspective view of an upper surface side of a hub body of a chucking apparatus according to an embodiment of the present invention.
Figure 2:
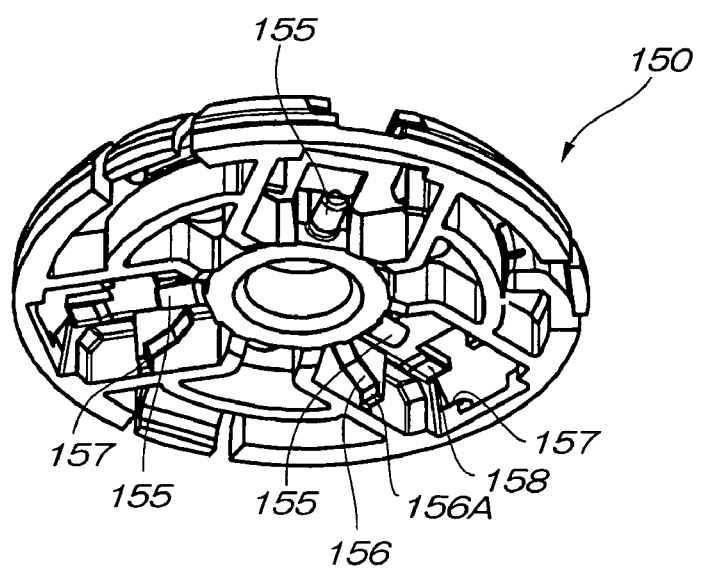
FIG. 2 is a perspective view of a lower surface side of the hub body.
Figure 3:
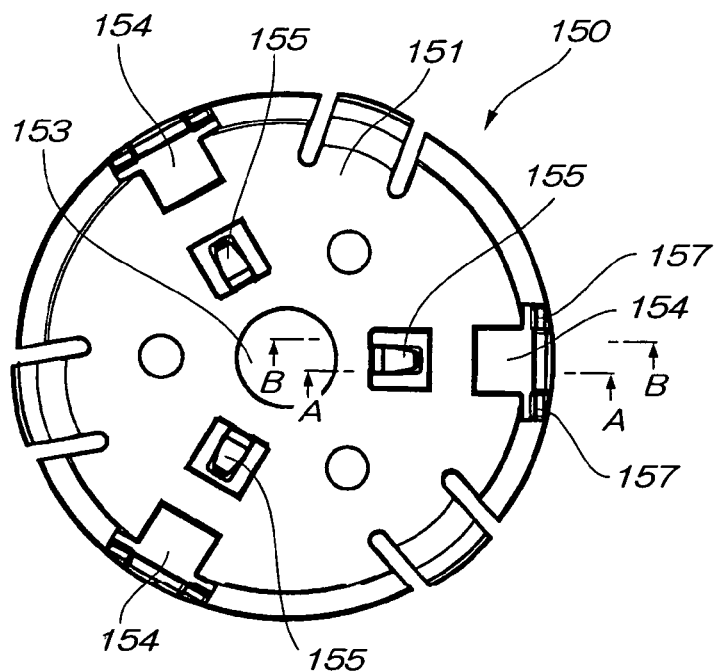
FIG. 3 is a front view of the hub body.
Figure 4:
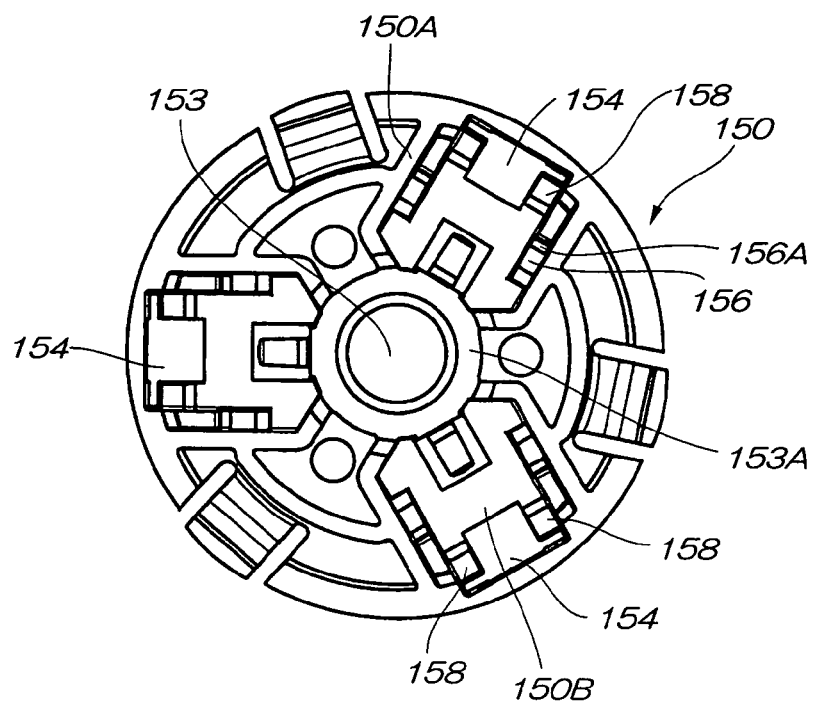
FIG. 4 is a rear view of the hub body.
Figure 5:
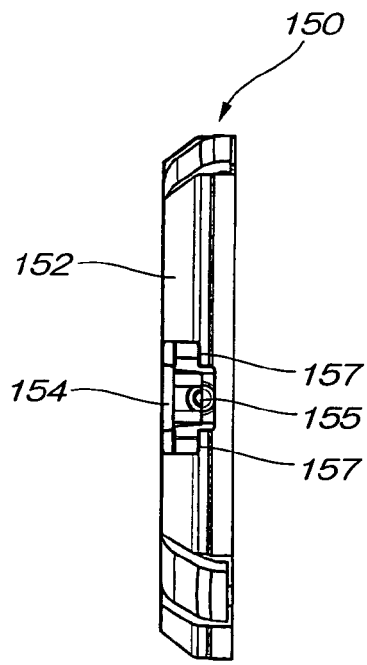
FIG. 5 is a side view of the hub body.
Figure 6:
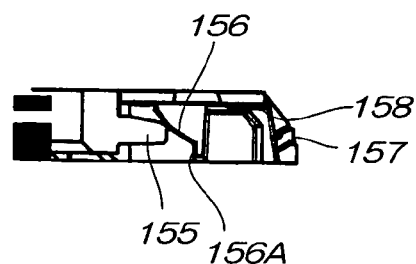
FIG. 6 is a sectional view taken along the line A-A in FIG. 3.
Figure 7:
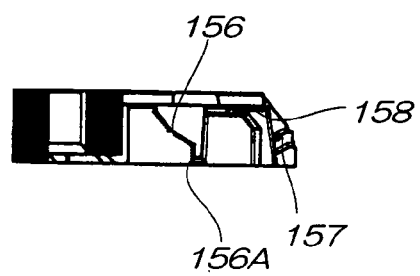
FIG. 7 is a sectional view taken along the line B-B in FIG. 3.

FIG. 1 is a perspective view of an upper surface side of a hub body of a chucking apparatus according to the embodiment. FIG. 2 is a perspective view of a lower surface side of the hub body. FIG. 3 is a front view of the hub body. FIG. 4 is a rear view of the hub body. FIG. 5 is a side view of the hub body. FIG. 6 is a sectional view taken along the line A-A in FIG. 3. FIG. 7 is a sectional view taken along the line B-B in FIG. 3.

A hub body 150 of a turntable is formed into a dish-like shape and comprises a disk-like upper surface 151 and a side surface 152 standing on an outer periphery of the upper surface 151. The upper surface 151 is formed at its center with a motor shaft hole 153 into which a rotation shaft of a spindle motor is fitted.

The hub body 150 is radially provided with three pawl openings 154. Each pawl opening 154 is provided in a range from the outer periphery of the upper surface 151 to the side surface 152. A side surface opening width of the side surface 152 is larger than an upper surface opening width of the outer periphery of the upper surface 151.

The hub body 150 is provided at its back surface with three coil stoppers 155 projecting on an outer periphery of a ring-like rib 153A forming the motor shaft hole 153. Each coil stopper 155 is radially provided toward the pawl openings 154.

The hub body 150 is provided at its back surface with a plurality of connecting ribs 150A which connects the ring-like rib 153A and the side surface 152 with each other. The pair of connecting ribs 150A forms a pawl accommodation space 150B where a pawl body 170 is disposed such that a space including one coil stopper 155 and the pawl opening 154 located in the axial direction of this coil stopper 155 is isolated from other spaces.

Opposed inner peripheral surfaces of the pair of connecting ribs forming the pawl accommodation space 150B are provided hub-side stoppers 156A and inner side guide surfaces 156 located on an inner side of the hub-side stopper 156A. Each inner side guide surface 156 comprises an inclined surface which is gradually increased in height toward the center of the hub body 150. The inner side guide surface 156 comprises at least a first inclined surface and a second inclined surface.

Upward receiving surfaces 157 are formed on upper surfaces of both sides of the pawl opening 154 of the side surface 152. Downward receiving surfaces 158 are formed on lower surface of both sides of the pawl opening 154 of the upper surface 151.

Next, a pawl body constituting the chucking apparatus of the embodiment will be explained.

Figure 8:
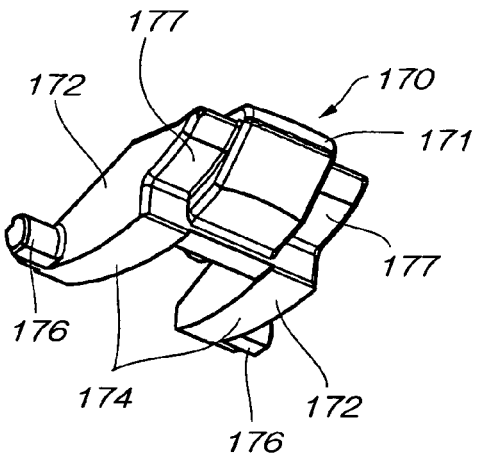
FIG. 8 is a perspective view of a lower surface side of a pawl body of the chucking apparatus of the embodiment.
Figure 9:
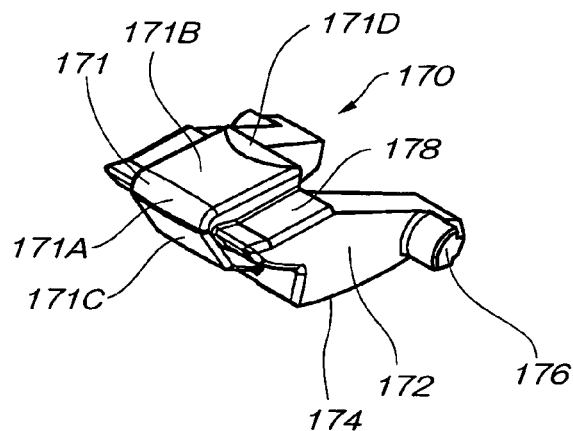
FIG. 9 is a perspective view of an upper surface outer side of the pawl body.
Figure 10:
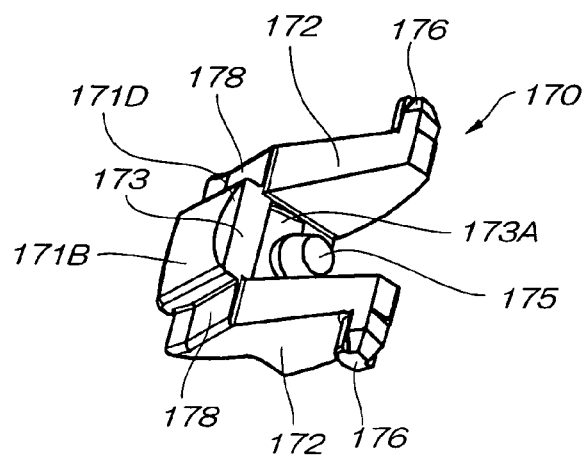
FIG. 10 is a perspective view of an upper surface inner side of the pawl body.
Figure 11:
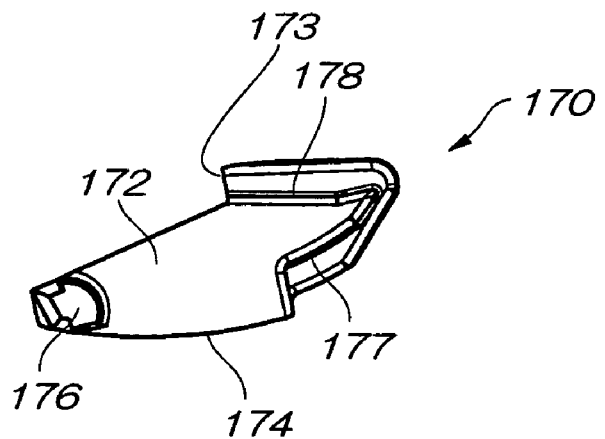
FIG. 11 is a side view of the pawl body.
Figure 12:
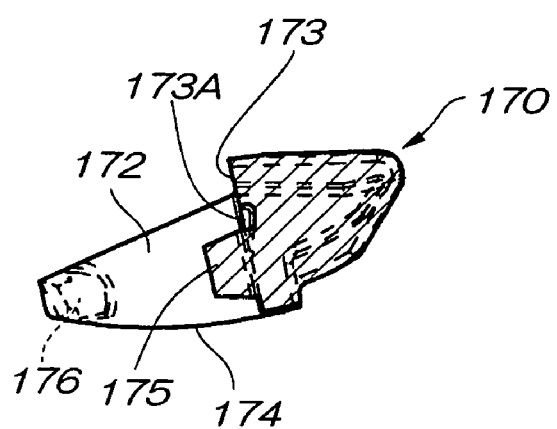
FIG. 12 is a side sectional view of the pawl body.
Figure 13:
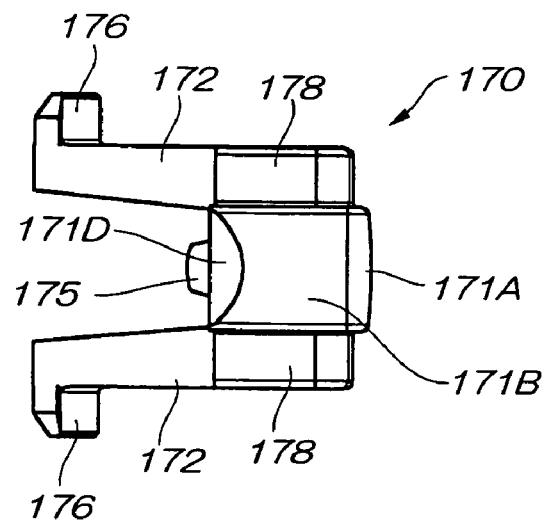
FIG. 13 is a front view of the pawl body.
Figure 14:
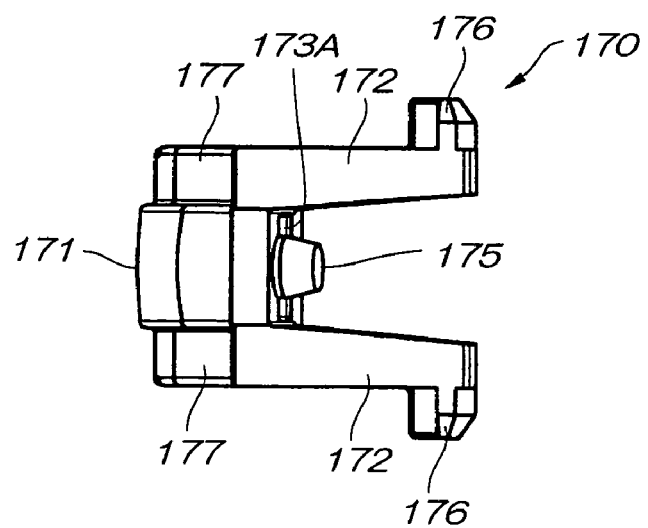
FIG. 14 is a rear view of the pawl body.

FIG. 8 is a perspective view of a lower surface side of a pawl body of the chucking apparatus of the embodiment. FIG. 9 is a perspective view of an upper surface outer side of the pawl body. FIG. 10 is a perspective view of an upper surface inner side of the pawl body. FIG. 11 is a side view of the pawl body. FIG. 12 is a side sectional view of the pawl body. FIG. 13 is a front view of the pawl body. FIG. 14 is a rear view of the pawl body.

The pawl body 170 comprises a pawl portion 171 and guide portions 172 disposed on both sides of the pawl portion 171.

When the pawl portion 171 is mounted on the hub body 150, the pawl portion 171 comprises a tip end 171A located at an outermost periphery of the hub body 150, an upper surface 171B which is connected to the tip end 171A and comprises a flat surface, and a disk holding surface 171C which is connected to the tip end 171A downward and which abuts against the disk center hole. A tapered surface 171D is provided on an inner side of the upper surface 171B.

A rear end surface 173 against which a coil spring abuts is constituted on an inner side of the pawl portion 171, and the rear end surface 173 includes a coil stopper 175 formed by a projection. A dent 173A is formed around an upper portion of the coil stopper 175 in the rear end surface 173. An angle of a surface (dent 173A) against which an upper portion of the coil spring abuts and an angle of a surface (rear end surface 173) against which a lower portion of the coil spring abuts are made different from each other by providing the dent 173A in the rear end surface 173 at a position where the upper portion of the coil spring abuts.

In a state where the upper portion of the coil spring abuts against the dent 173A of the rear end surface 173, a surface of the dent 173A is perpendicular to the center line of the coil spring.

A lower end surface 174 of each of the guide portions 172 is formed into an arc shape. A pawl-side stopper 176 projecting sideway is provided on an inner side of each of the guide portions 172.

The pawl portion 171 is located on the outer side of the guide portion 172. The pawl portion 171 is provided at its side with a downward guide surface 177 located at a position lower than the tip end 171A of the pawl portion 171 and an upward guide surface 178 located at a position higher than the disk holding surface 171C. In a state where the pawl body 170 is mounted on the hub body 150, the downward guide surface 177 is disposed at a position opposed to the upward receiving surface 157, and if the pawl body 170 is pressed from above, the downward guide surface 177 slides along the upward receiving surface 157. In a state where the pawl body 170 is mounted on the hub body 150, the upward guide surface 178 is disposed at a position opposed to the downward receiving surface 158. An outer end of the upward guide surface 178 is higher than the upward guide surface 178. The downward guide surface 177 comprises at least a first inclined surface and a second inclined surface.

Next, further detailed structure of the chucking apparatus and the chucking operation of the embodiment will be explained with reference to FIGS. 15 to 20.

Figure 15:
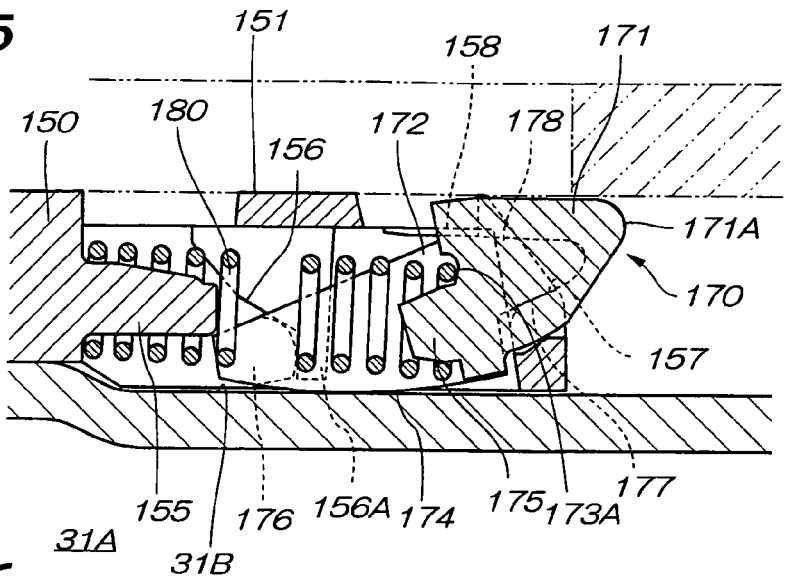
FIG. 15 is a sectional view of an essential portion of the chucking apparatus showing a standby state or a state immediately after a disk is inserted into a disk apparatus.

FIG. 15 is a sectional view of an essential portion of the chucking apparatus showing a standby state or a state immediately after a disk is inserted into a disk apparatus.

The hub body 150 is provided at the center of the upper surface of a spindle motor 31A. The pawl body 170 is disposed between the hub body 150 and a rotor-side receiving surface 31B of the spindle motor 31A.

A coil spring 180 is provided as a resilient member between the coil stopper 155 of the hub body 150 and the coil stopper 175 of the pawl body 170. That is, the pawl body 170 is biased outward of the hub body 150 by the coil spring 180. The coil spring 180 is provided such that the outer end thereof on the side of the coil stopper 175 is located at a position lower than an inner end of the coil spring 180 on the side of the coil stopper 155.

The pawl-side stopper 176 abuts against the hub-side stopper 156A so that the pawl body 170 does not jump outward. The abutment position between the pawl-side stopper 176 and the hub-side stopper 156A is located inward of the hub body 150 as compared with the pawl portion 171 and lower than the center line of the coil spring 180.

In a state immediately after a disk is inserted into the disk apparatus as shown in FIG. 15, the pawl portion 171 of the pawl body 170 is disposed at a position lower than the upper surface 151 of the hub body 150. The upper portion of the outer end of the coil spring 180 abuts against the dent 173A of the rear end surface 173. This situation is the same even in a standby state where no disk is inserted.

Figure 16:
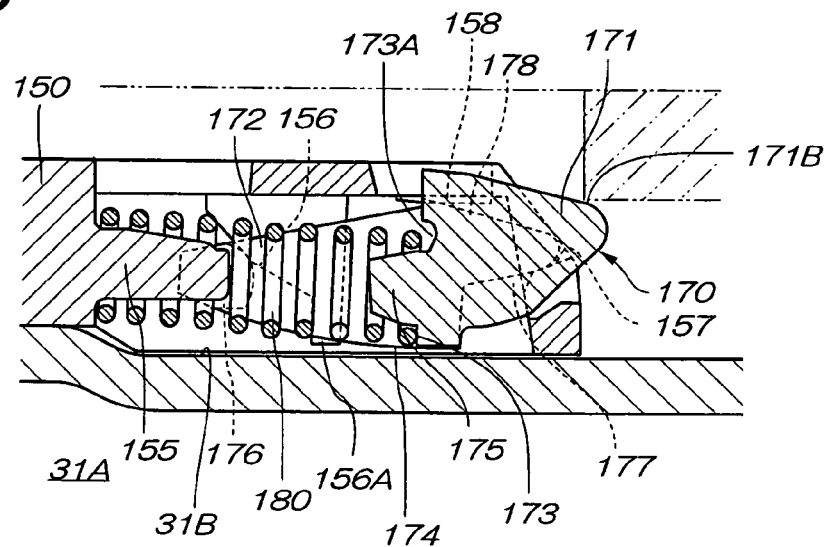
FIG. 16 is a sectional view of an essential portion of the chucking apparatus showing a state where the chucking apparatus is brought upward by a predetermined distance toward a disk from the state shown in FIG. 15.

FIG. 16 is a sectional view of an essential portion of the chucking apparatus showing a state where the chucking apparatus is brought upward by a predetermined distance toward a disk from the state shown in FIG. 15.

The chucking apparatus is brought upward, and the pawl portion 171 is pressed by a disk from the upper surface 171B.

If the pawl portion 171 is pressed from the upper surface 171B in this manner, the pawl-side stopper 176 slides along the inner side guide surface 156. That is, the pawl-side stopper 176 slides such that it gradually becomes higher toward the inner side of the hub body 150. The downward guide surface 177 slides along the upward receiving surface 157 together with the movement of the pawl-side stopper 176. Therefore, the pawl body 170 moves inward of the hub body 150 by the sliding motion of the pawl-side stopper 176 and the downward guide surface 177. If the pawl portion 171 is pressed from the upper surface 171B, an upper portion of the outer end of the coil spring 180 is separated from the dent 173A of the rear end surface 173, and a lower portion of the outer end of the coil spring 180 abuts against the rear end surface 173.

Figure 17:
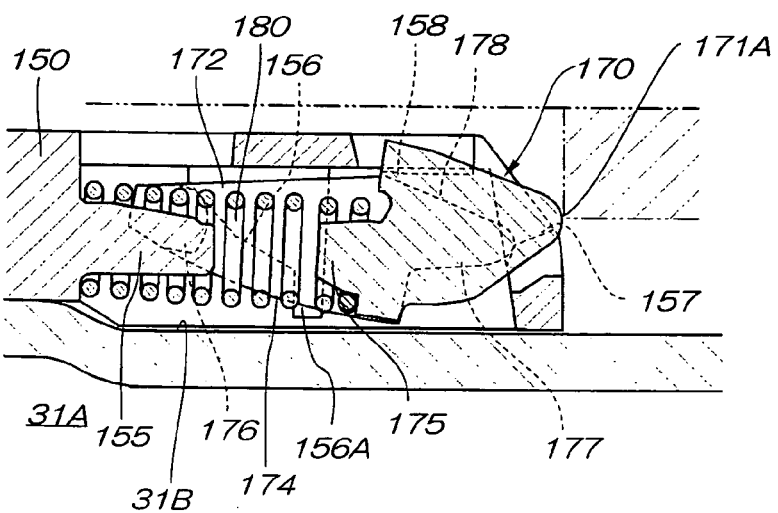
FIG. 17 is a sectional view of an essential portion of the chucking apparatus showing a state where a tip end of a pawl portion is inserted into a center hole of a disk.
Figure 18:
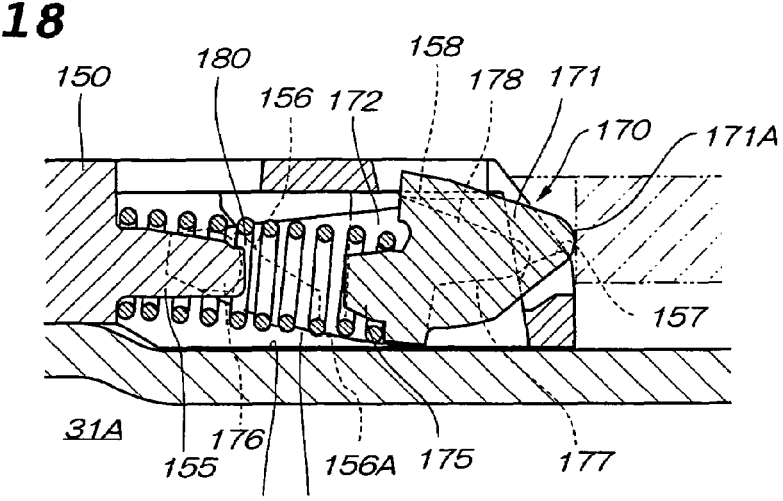
FIG. 18 is a sectional view of an essential portion of the chucking apparatus showing a state where the chucking apparatus is brought upward by a predetermined distance toward the disk from the state shown in FIG. 17.
Figure 19:
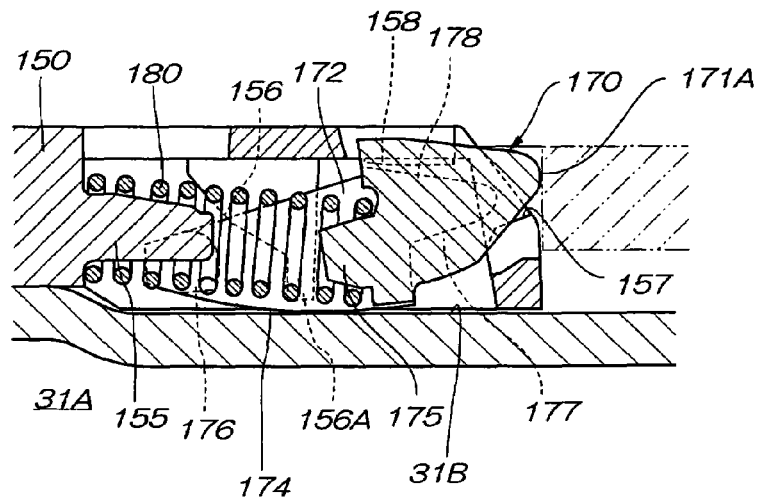
FIG. 19 is a sectional view of an essential portion of the chucking apparatus showing a state where a predetermined time is elapsed from the state shown in FIG. 18.

FIG. 17 is a sectional view of an essential portion of the chucking apparatus showing a state where a tip end of a pawl portion is inserted into a center hole of a disk. FIG. 18 is a sectional view of an essential portion of the chucking apparatus showing a state where the chucking apparatus is brought upward by a predetermined distance toward the disk from the state shown in FIG. 17. FIG. 19 is a sectional view of an essential portion of the chucking apparatus showing a state where a predetermined time is elapsed from the state shown in FIG. 18.

FIG. 17 shows a state where the tip end 171A of the pawl portion 171 is inserted into a center hole of a disk. If the chucking apparatus is further moved upward toward the disk from the state shown in FIG. 17, the tip end 171A of the pawl portion 171 slides along the inner peripheral surface of the center hole of the disk as shown in FIG. 18. In this embodiment, the chucking apparatus is moved upward toward the disk by the interaction between the pawl portion 171 and the hub body 150 up to the position shown in FIG. 18. In the position shown in FIG. 18, i.e., in the upper limit state toward the disk by the interaction between the pawl portion 171 and the hub body 150, the downward guide surface 177 of the pawl portion 171 and the upward receiving surface 157 of the hub body 150 come into contact with each other, the lower end surface 174 of the pawl portion 171 comes into contact with the rotor-side receiving surface 31B, and the tip end 171A of the pawl portion 171 is in contact with the inner peripheral surface of the center hole of the disk. By appropriately setting the relation between the biasing force of the coil spring 180 and the friction resistance between a disk and the tip end 171A of the pawl portion 171, the tip end 171A of the pawl portion 171 slides on an inner wall surface of the center hole of the disk without operating the chucking apparatus from the state shown in FIG. 18. By the operation after the position shown in FIG. 18, the downward guide surface 177 of the pawl portion 171 separates from the upward receiving surface 157 of the hub body 150. The tip end 171A of the pawl portion 171 moves upward on the inner peripheral surface of the center hole of the disk little by little while keeping a state where the tip end 171A is in contact with the inner peripheral surface of the center hole of the disk. The lower end surface 174 of the pawl portion 171 is in contact with the rotor-side receiving surface 31B and in this state, the contact point between the lower end surface 174 and the receiving surface 31B moves inward little by little.

The inner side guide surface 156 comprises at least the first inclined surface and the second inclined surface as described above. If the pawl portion 171 is pressed by the disk, the first inclined surface is a surface against which the pawl-side stopper 176 abuts when the tip end 171A of the pawl portion 171 is inserted into the center hole, or before the tip end 171A is inserted into the center hole of the disk. The second inclined surface is a surface against which the pawl-side stopper 176 abuts after the tip end 171A of the pawl portion 171 is inserted into the center hole. An angle formed between the second inclined surface and the pressing direction is smaller than an angle formed between the first inclined surface and the pressing direction.

The downward guide surface 177 comprises at least the first inclined surface and the second inclined surface as described above. The first inclined surface is a surface against which the upward receiving surface 157 abuts when the tip end 171A of the pawl portion 171 is inserted into the center hole of the disk or before the tip end 171A is inserted into the center hole of the disk. The second inclined surface is a surface against which the upward receiving surface 157 abuts after the tip end 171A of the pawl portion 171 is inserted into the center hole of the disk. An angle formed between the second inclined surface and the pressing direction is smaller than an angle formed between the first inclined surface and the pressing direction. The first inclined surface of the downward guide surface 177 comprises an arc surface, and the second inclined surface of the downward guide surface 177 comprises a flat surface.

The inner side guide surface 156 and the downward guide surface 177 comprise the first inclined surfaces and the second inclined surfaces. With this configuration, the sliding motion between the tip end 171A of the pawl portion 171 and the inner wall surface of the center hole of the disk can be carried out stably.

Figure 20:
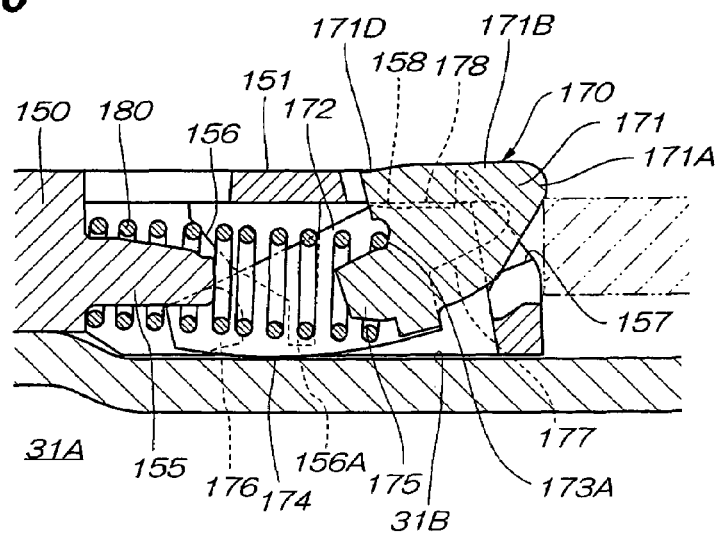
FIG. 20 is a sectional view of an essential portion of the chucking apparatus showing a state where a predetermined time is elapsed from the state shown in FIG. 19.

FIG. 20 is a sectional view of an essential portion of the chucking apparatus showing a state where a predetermined time is elapsed from the state shown in FIG. 19.

FIG. 20 shows a state where the tip end 171A of the pawl portion 171 projects beyond the upper surface of the disk, and this means that the chucking operation is completed and this state is a recording or replaying state.

When the chucking operation is completed, the upper portion of the outer end of the coil spring 180 is in abutment against the dent 173A of the rear end surface 173. The pawl portion 171 is located higher than the upper surface 151 of the hub body 150. In the chucking operation completed state, the disk holding surface 171C of the pawl portion 171 is in contact with an upper end of the center hole of the disk, and the tip end 171A of the pawl portion 171 protrudes closer to the outer peripheral side than the center hole of the disk and jumps upward higher than the upper surface of the disk. The upward guide surface 178 of the pawl portion 171 comes into contact with the downward receiving surface 158 of the hub, and the lower end surface 174 of the pawl portion 171 is in contact with the rotor-side receiving surface 31B.

Next, the chucking operation of disks having different thicknesses will be explained with reference to FIGS. 21 to 23.

Figure 21:
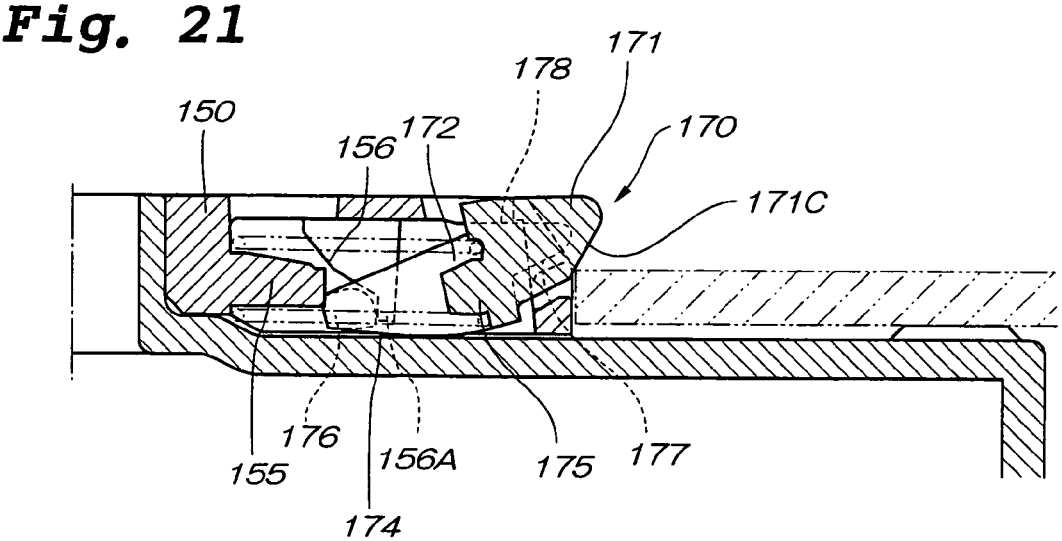
FIG. 21 is a sectional view of an essential portion of the chucking apparatus showing a state where a chucking operation of a thin disk is completed.

FIG. 21 is a sectional view of an essential portion of the chucking apparatus showing a state where a chucking operation of a thin disk is completed. FIG. 22 is a sectional view of an essential portion of the chucking apparatus showing a state where a chucking operation of a disk having an intermediate thickness is completed. FIG. 23 is a sectional view of an essential portion of the chucking apparatus showing a state where a chucking operation of a thick disk is completed.

Figure 22:
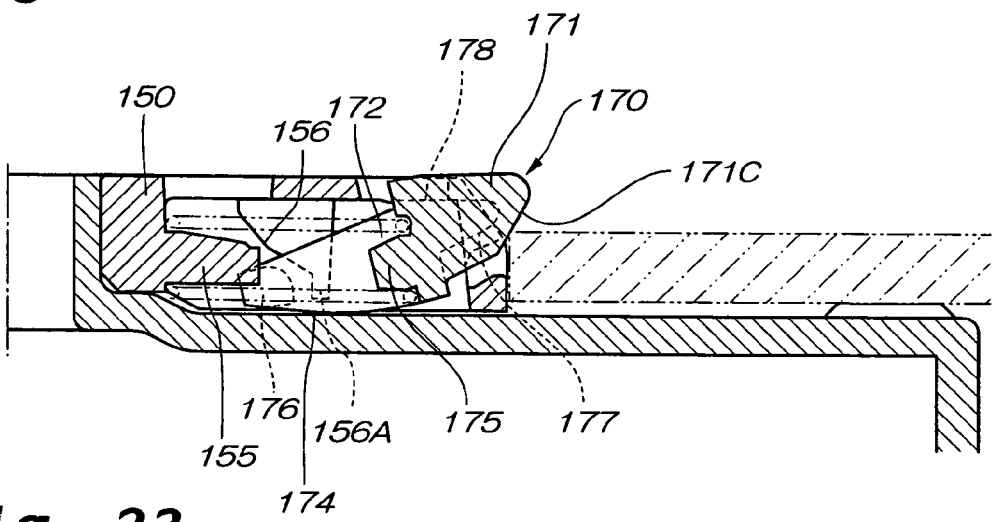
FIG. 22 is a sectional view of an essential portion of the chucking apparatus showing a state where a chucking operation of a disk having an intermediate thickness is completed.
Figure 23:
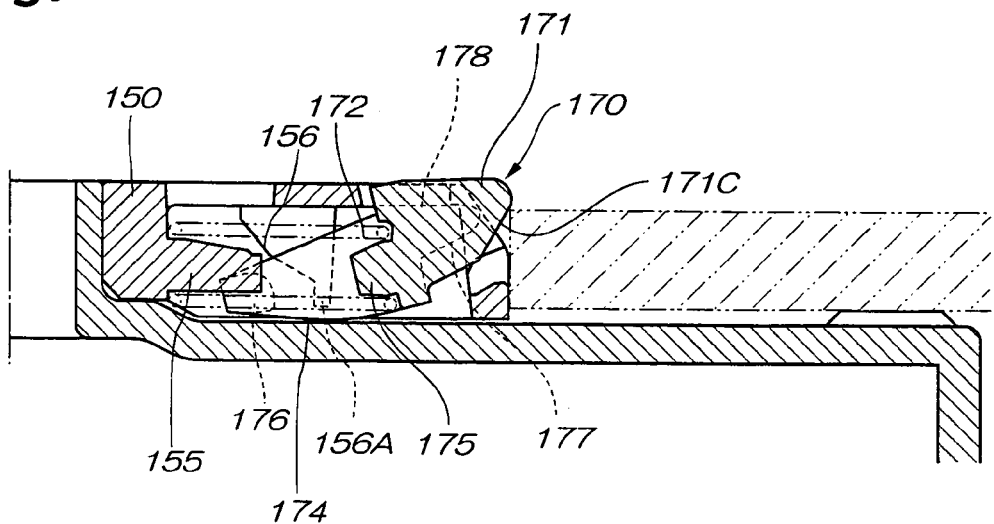
FIG. 23 is a sectional view of an essential portion of the chucking apparatus showing a state where a chucking operation of a thick disk is completed.

In a case a disk shown in FIG. 21 is thin, as compared with a case where a disk shown in FIG. 22 has an intermediate thickness, the pawl body 170 moves outward of the hub body 150, and the position of the tip end 171A of the pawl portion 171 becomes lower. In a case the disk shown in FIG. 22 has the intermediate thickness, as compared with a case where a disk shown in FIG. 23 is thick, the pawl body 170 moves outward of the hub body 150, and the position of the tip end 171A of the pawl portion 171 becomes lower. According to this embodiment, the height of the pawl can be suppressed to a low level even if the moving stroke of the pawl body 170 in the radial direction of the hub body 150 is increased in correspondence with the variation of the disk thickness.

A disk apparatus to which the chucking apparatus of the embodiment is applied will be explained.

Figure 24:
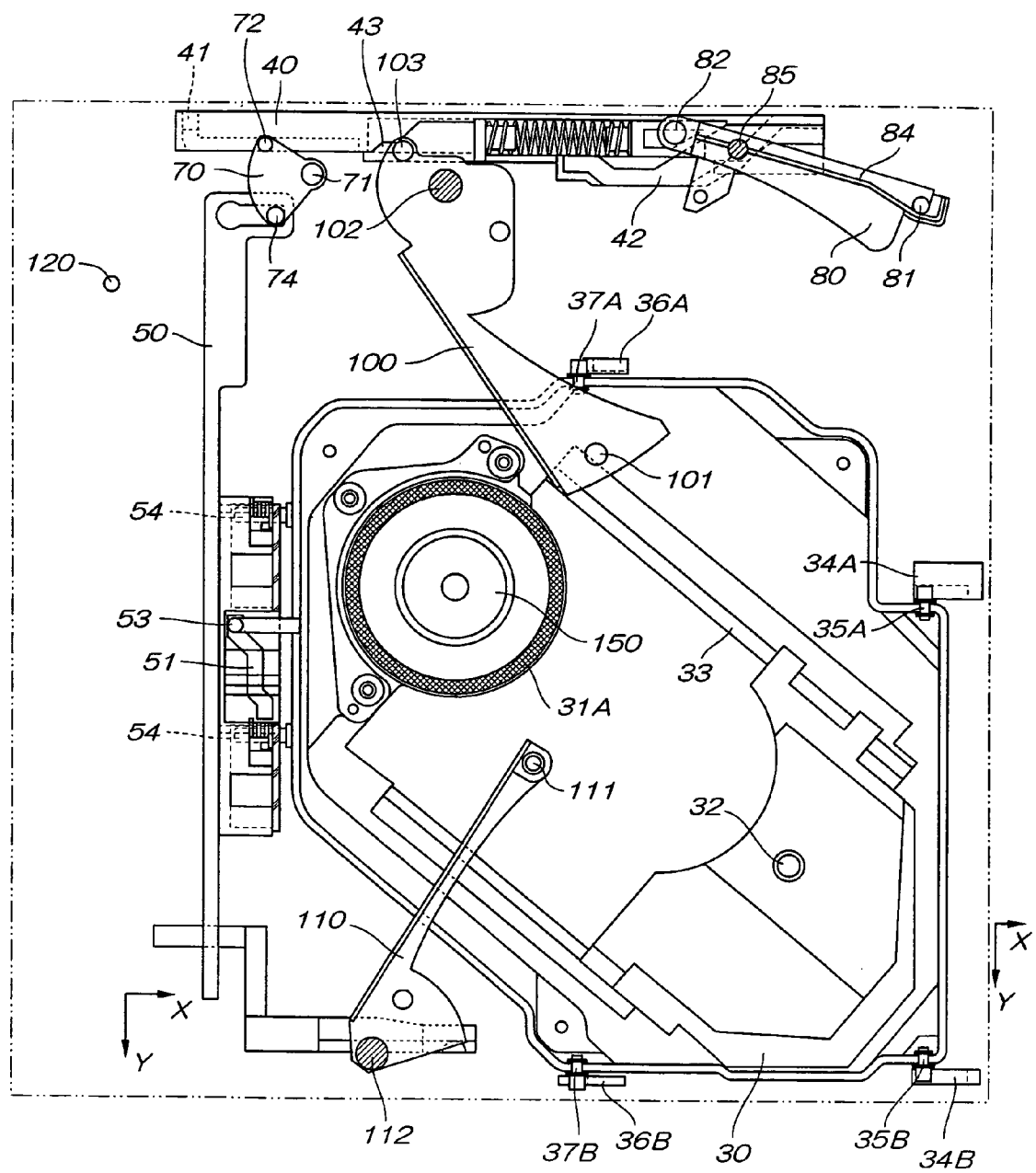
FIG. 24 is a plan view of an essential portion of a base body of the disk apparatus according to the embodiment.
Figure 25:
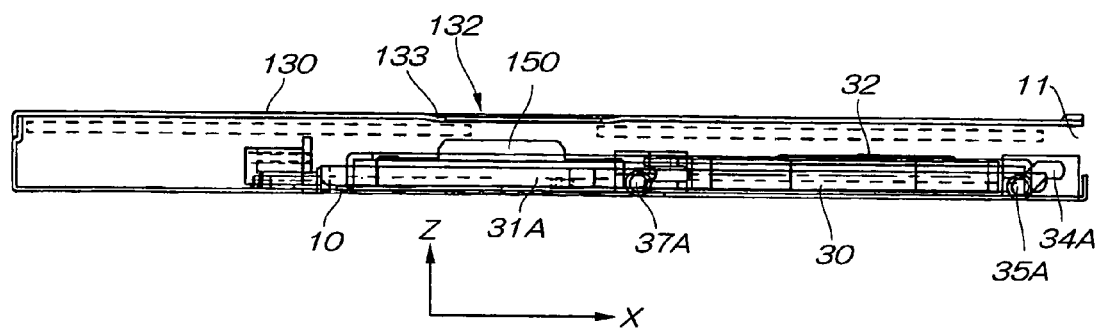
FIG. 25 is a side sectional view of an essential portion of the disk apparatus.
Figure 26:
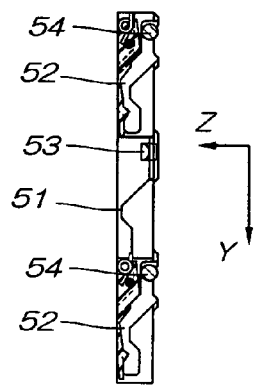
FIG. 26 is a side view of a sub-slider of the disk apparatus.

FIG. 24 is a plan view of an essential portion of a base body of the disk apparatus according to the embodiment. FIG. 25 is a side sectional view of an essential portion of the disk apparatus. FIG. 26 is a side view of a sub-slider of the disk apparatus.

The disk apparatus of this embodiment includes a chassis outer sheath comprising a base body and a lid. A bezel is mounted on a front surface of the chassis outer sheath. The disk apparatus of this embodiment is a slot-in type disk apparatus in which a disk is directly inserted from a disk inserting opening formed in the bezel.

A disk inserting opening 11 into which a disk is directly inserted is formed in a front side of a base body 10. A traverse 30 is disposed in the base body 10.

The traverse 30 holds the spindle motor 31A, a pickup 32, and drive means 33 for moving the pickup 32. A rotation shaft of the spindle motor 31A includes the hub body 150 for holding a disk. The spindle motor 31A is provided on one end of the traverse 30. The pickup 32 is disposed on the other end of the traverse 30 in a standby state or a chucking state. The pickup 32 can move from one end to the other end of the traverse 30. The drive means 33 includes a drive motor, a pair of rails for allowing the pickup 32 to slide, and a gear mechanism for transmitting a driving force of the drive motor to the pickup 32. The pair of rails are disposed on the opposite sides of the pickup 32 such that the one end and the other end of the traverse 30 are in contact with each other.

In the traverse 30, the spindle motor 31A is located at a central portion of the base body 10, a reciprocating range of the pickup 32 is located closer to the disk inserting opening 11 than the spindle motor 31A, and a reciprocating direction of the pickup 32 is different from an inserting direction of the disk. Here, an angle formed between the reciprocating direction of the pickup 32 and the inserting direction of the disk is 40 to 45°.

The traverse 30 is supported on the base body 10 by a pair of fixing cams 34A and 34B. It is preferable that the pair of fixing cams 34A and 34B are disposed closer to the pickup 32 than the spindle motor 31A and are disposed closer to the disk inserting opening 11 than the standby position of the pickup 32. In this embodiment, the fixing cam 34A is provided at a central portion in the vicinity of an inside of the disk inserting opening 11, and the fixing cam 34B is provided on the one end in the vicinity of the inside of the disk inserting opening 11. The fixing cams 34A and 34B comprise grooves of predetermined lengths extending in the inserting direction of the disk. The end of one end of the groove close to the disk inserting opening 11 is separated away from the base body 10 than the other end thereof by a first Y axis distance. Cam pins 35A and 35B provided on the traverse 30 slide in the grooves of the fixing cams 34A and 34B, thereby displacing the traverse 30 in the inserting/discharging direction (X axis direction) of the disk and displacing the traverse 30 in a direction (z axis direction) in which the traverse 30 is brought close to and away from the base body 10.

A main slider 40 and a sub-slider 50 which move the traverse 30 will be explained next.

The main slider 40 and the sub-slider 50 are disposed sideway of the spindle motor 31A. The main slider 40 is disposed in such a direction that one end thereof is close to a front surface of the base body 10 and the other end of the main slider 40 is close to a rear surface of the base body 10. The sub-slider 50 is disposed in such a direction that intersects with the main slider 40 at right angles.

A cam mechanism for displacing the traverse 30 comprises a slider cam mechanism 51 and a vertically moving cam mechanism 52. The cam mechanism is provided on the sub-slider 50. The slider cam mechanism 51 comprises a groove of a predetermined length extending in a moving direction of the sub-slider 50. This groove approaches the disk inserting opening 11 (X axis direction) in stages from its one end (closer to the main slider 40) toward the other end. The traverse 30 is provided with a slide pin 53. The slide pin 53 provided on the traverse 30 slides in the groove of the slider cam mechanism 51, thereby displacing the traverse 30 in the inserting/discharging direction (X axis direction) of the disk. The vertically moving cam mechanism 52 comprises a groove of a predetermined length extending in the moving direction of the sub-slider 50. A distance (Z axis distance) between the groove and the base body 10 is varied in stages from one end thereof (closer to the main slider 40) toward the other end. The vertically moving pin 54 provided on the traverse 30 slides in the groove of the vertically moving cam mechanism 52, thereby displacing the traverse 30 in a direction (Z axis direction) in which the traverse 30 is brought close to and away from the base body 10.

A loading motor (not shown) is disposed on one end of the main slider 40. A drive shaft of the loading motor and one end of the main slider 40 are connected to each other through a gear mechanism (not shown).

The main slider 40 can slide in a longitudinal direction (X axis direction) by driving the loading motor. The main slider 40 is connected to the sub-slider 50 through a cam lever 70.

The cam lever 70 includes a turning fulcrum 71, the cam lever 70 is engaged with a cam groove 41 provided in the main slider 40, and the cam lever 70 is engaged with a cam groove provided in the sub-slider 50 through a pin 74.

The cam lever 70 moves the sub-slider 50 in association with movement of the main slider 40, operates the slider cam mechanism 51 and the vertically moving cam mechanism 52 by the movement of the sub-slider 50, and displaces the traverse 30.

The traverse 30 is further supported on the base body 10 by a pair of fixing cams 36A and 36B also. It is preferable that the pair of fixing cams 36A and 36B are disposed between the fixing cams 34A and 34B and the sub-slider 50, and are disposed at intermediate positions between the fixing cams 34A and 34B and the sub-slider 50. The fixing cams 36A and 36B comprise grooves of predetermined lengths which are the same structures as those of the fixing cams 34A and 34B. Cam pins 37A and 37B provided on the traverse 30 slide in the fixing cams 36A and 36B, thereby displacing the traverse 30 in the inserting direction of the disk, and displacing the traverse 30 in a direction in which the traverse 30 is brought close to and away from the base body 10.

The above explained traverse 30, fixing cams 34A, 34B, 36A, and 36B, main slider 40, sub-slider 50, and loading motor are provided on the base body 10, and form a disk-inserting space between a lid 130 and these members.

Next, a guide member for supporting a disk and a lever member for operating the disk will be explained.

A first disk guide (not shown) of a predetermined length is provided on one end side of the base body 10 in the vicinity of the disk inserting opening 11. The first disk guide has a groove having a U-shaped cross section as viewed from a disk inserting direction. A disk is supported by this groove.

A pulling-in lever 80 is provided on the other end side of the base body 10 in the vicinity of the disk inserting opening 11. A movable side end of the pulling-in lever 80 includes a second disk guide 81. The second disk guide 81 comprises a cylindrical roller, and the second disk guide 81 is turnably provided on the movable side end of the pulling-in lever 80. A groove is formed in a roller outer periphery of the second disk guide 81, and the disk is supported by this groove.

The pulling-in lever 80 is disposed such that its movable side end is operated on the side of the disk inserting opening 11 than its fixed side end, and the fixed side end includes a turning fulcrum 82. A third disk guide 84 of a predetermined length is provided between the movable side end and the fixed side end of the pulling-in lever 80. The pulling-in lever 80 includes a pin 85. If the pin 85 slides in a cam groove 42 of the main slider 40, the pulling-in lever 80 is operated. That is, the pulling-in lever 80 is operated such that as the main slider 40 moves, the second disk guide 81 is brought close to and away from the spindle motor 31A.

The base body 10 is provided with a discharging lever 100. A guide 101 is provided on a movable side end of one end of the discharging lever 100. The discharging lever 100 is provided at its other end with a turning fulcrum 102. The discharging lever 100 is operated in association with motion of the main slider 40 by a pin 103 and a cam groove 43.

A discharging lever 110 is provided on the base body 10 on the side opposed to the discharging lever 110. A guide 111 is provided on a movable side end of one end of the discharging lever 110. A turning fulcrum 112 is provided on the other end of the discharging lever 110. The discharging lever 110 moves in the same manner as that of the discharging lever 100.

The base body 10 is provided at its rear side with a fixing pin 120. The fixing pin 120 limits a position of a disk when the disk is loaded or chucked.

As shown in FIG. 25, the chassis outer sheath comprises the base body 10 and a lid 130. The lid 130 is provided at its central portion with an opening 132. The opening 132 is a circular opening having a radius greater than a center hole of the disk. Therefore, the opening 132 is larger than the hub body 150 of the spindle motor 31A which is fitted into the center hole of the disk.

The opening 132 is formed at its outer periphery with a narrowed portion 133 projecting toward the base body 10.

A motion mechanism of the traverse 30 will be explained using FIGS. 24 to 38.

Positions of the cam mechanism and the pin in FIGS. 24 to 26 show a loading completion state of the disk.

Figure 27:
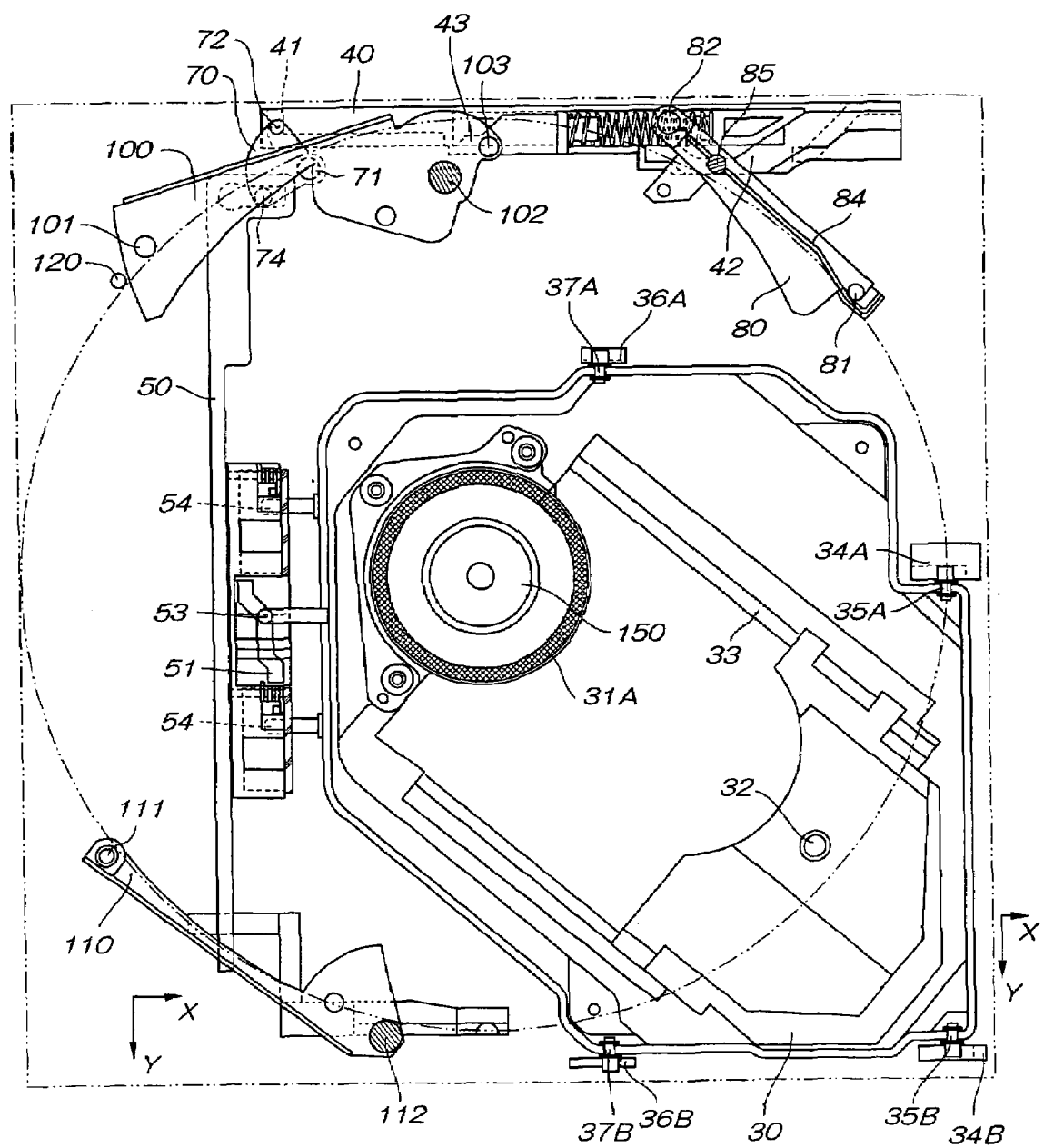
FIG. 27 is a plan view of an essential portion of the base body showing a state where a first predetermined time is elapsed after the chucking operation of a disk of the disk apparatus according to the embodiment is started.
Figure 28:
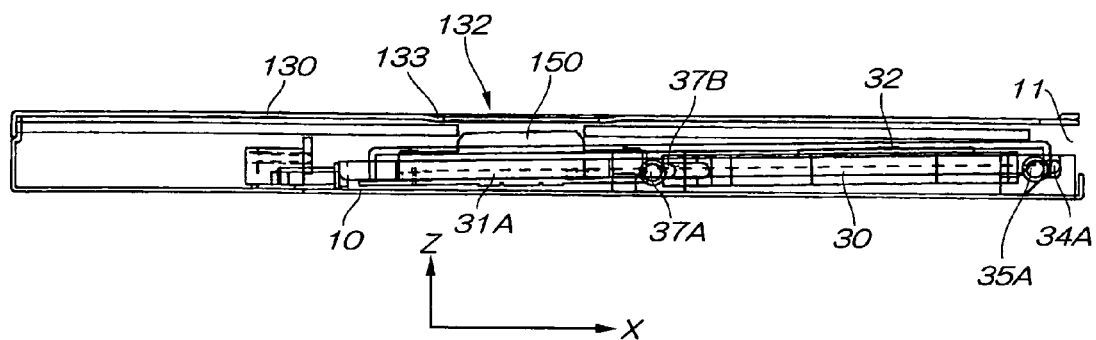
FIG. 28 is a side view of an essential portion in this state.
Figure 29:
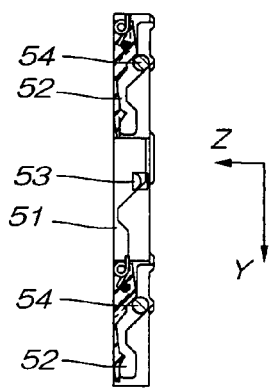
FIG. 29 is a side view of the sub-slider in this state.

FIG. 27 is a plan view of an essential portion of the base body showing a state where a first predetermined time is elapsed after the chucking operation of a disk of the disk apparatus is started. FIG. 28 is a side sectional view of an essential portion in this state. FIG. 29 is a side view of the sub-slider in this state.

Figure 30:
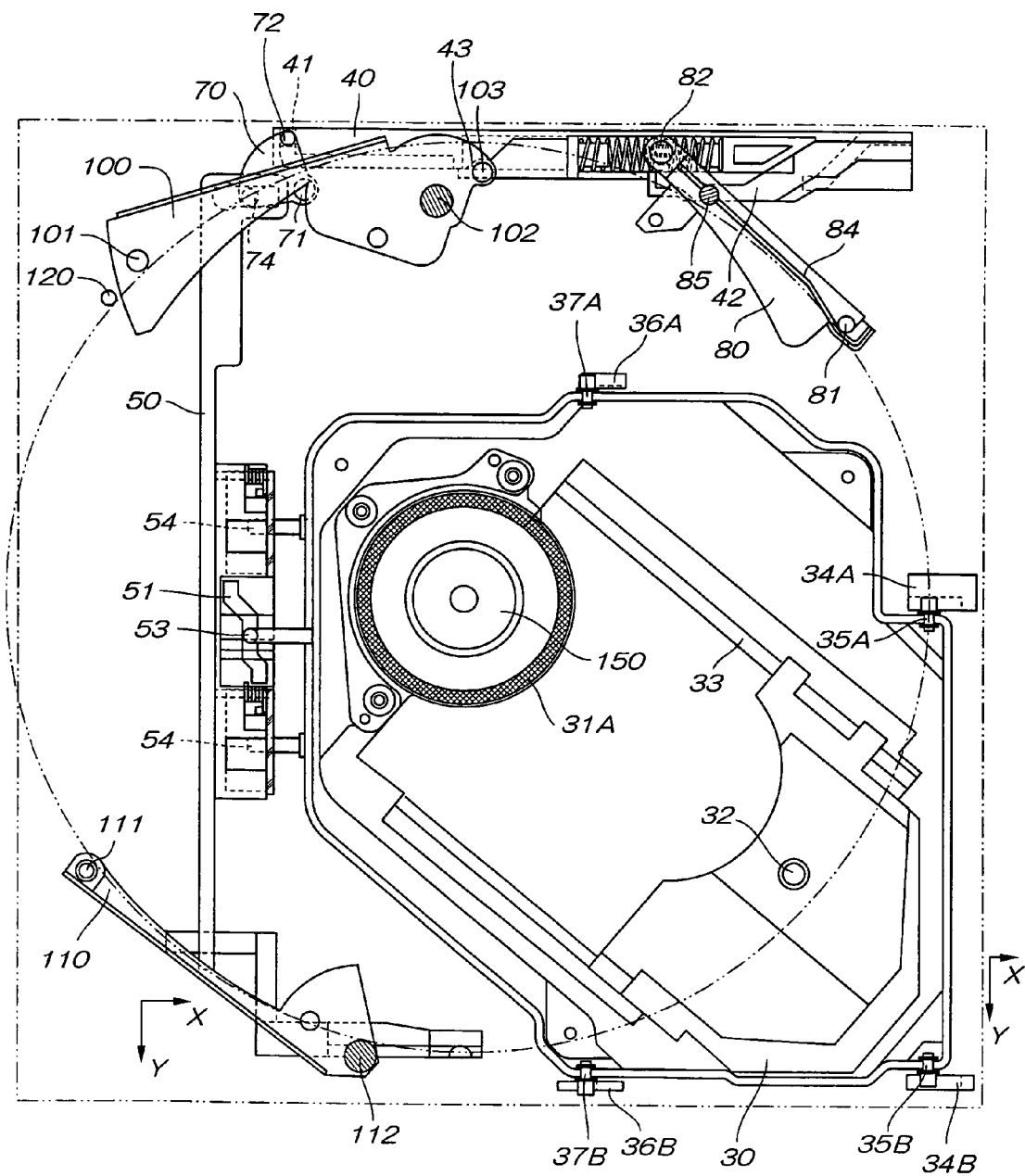
FIG. 30 is a plan view of an essential portion of the base body showing a state where a second predetermined time is elapsed from the state shown in FIG. 27.
Figure 31:
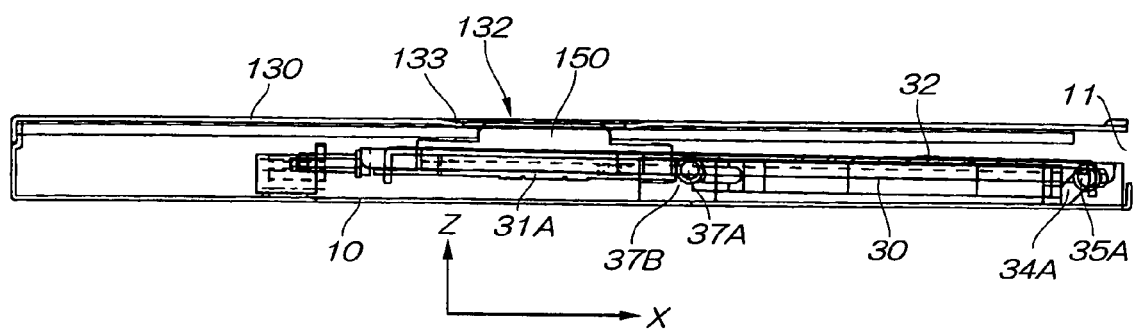
FIG. 31 is a side sectional view of an essential portion of this state.
Figure 32:
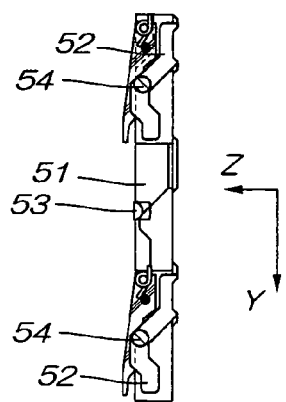
FIG. 32 is a side view of the sub-slider in this state.

FIG. 30 is a plan view of an essential portion of the base body showing a state where a second predetermined time is elapsed from the state shown in FIG. 27. FIG. 31 is a side sectional view of an essential portion of this state. FIG. 32 is a side view of the sub-slider in this state.

Figure 33:
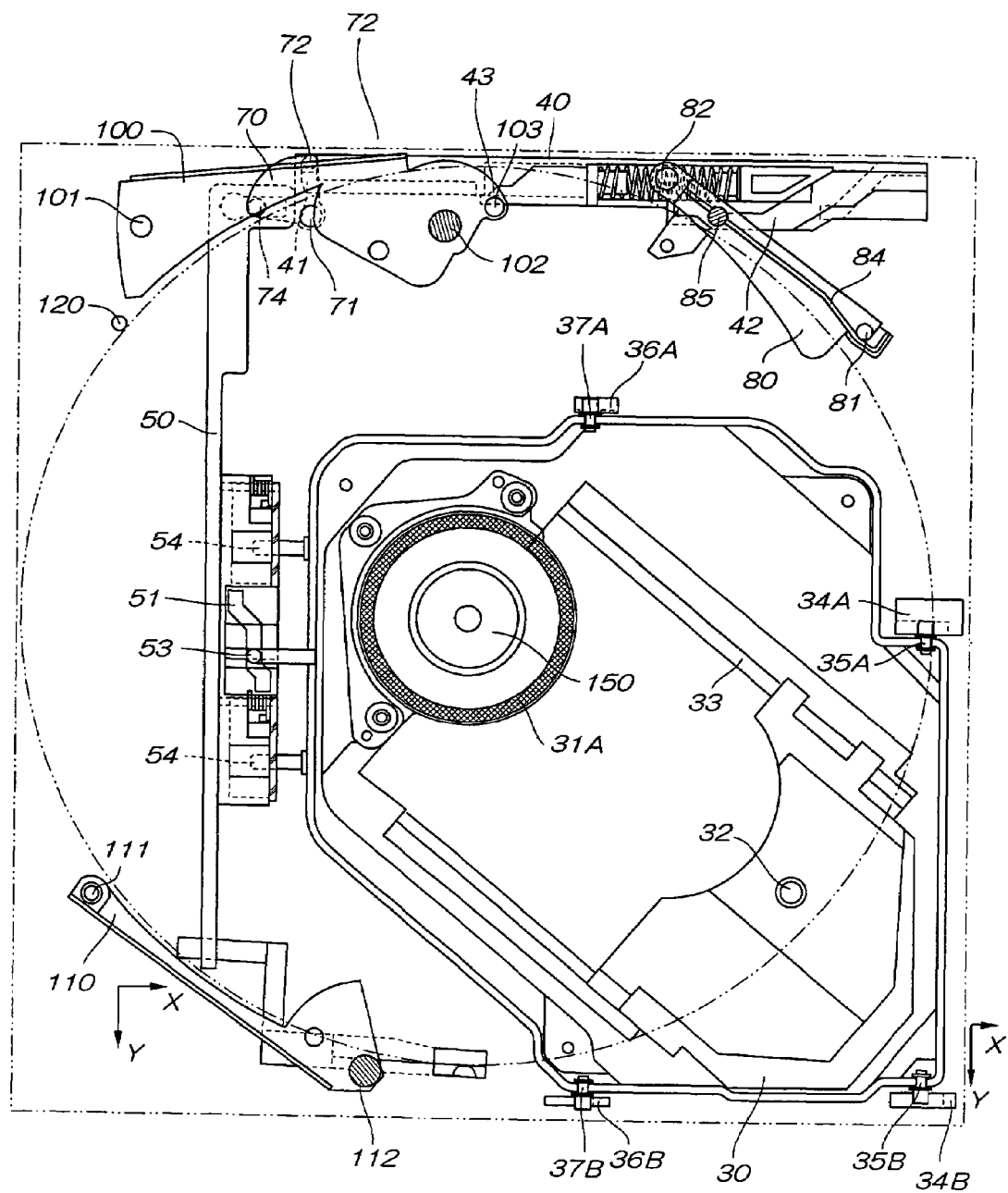
FIG. 33 is a plan view of an essential portion of the base body showing a state where a third predetermined time is elapsed from the state shown in FIG. 30 and a traverse is brought upward to its uppermost position.
Figure 34:
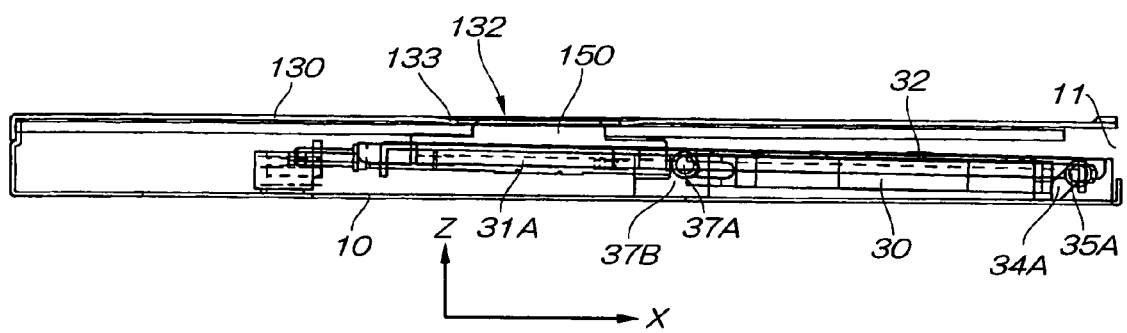
FIG. 34 is a side sectional view of an essential portion of this state.
Figure 35:
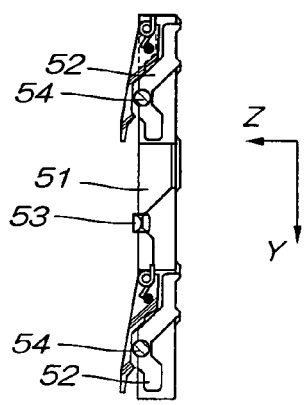
FIG. 35 is a side view of the sub-slider in this state.

FIG. 33 is a plan view of an essential portion of the base body showing a state where a third predetermined time is elapsed from the state shown in FIG. 30 and a traverse is brought upward to its uppermost position. FIG. 34 is a side sectional view of an essential portion of this state. FIG. 35 is a side view of the sub-slider in this state.

Figure 36:
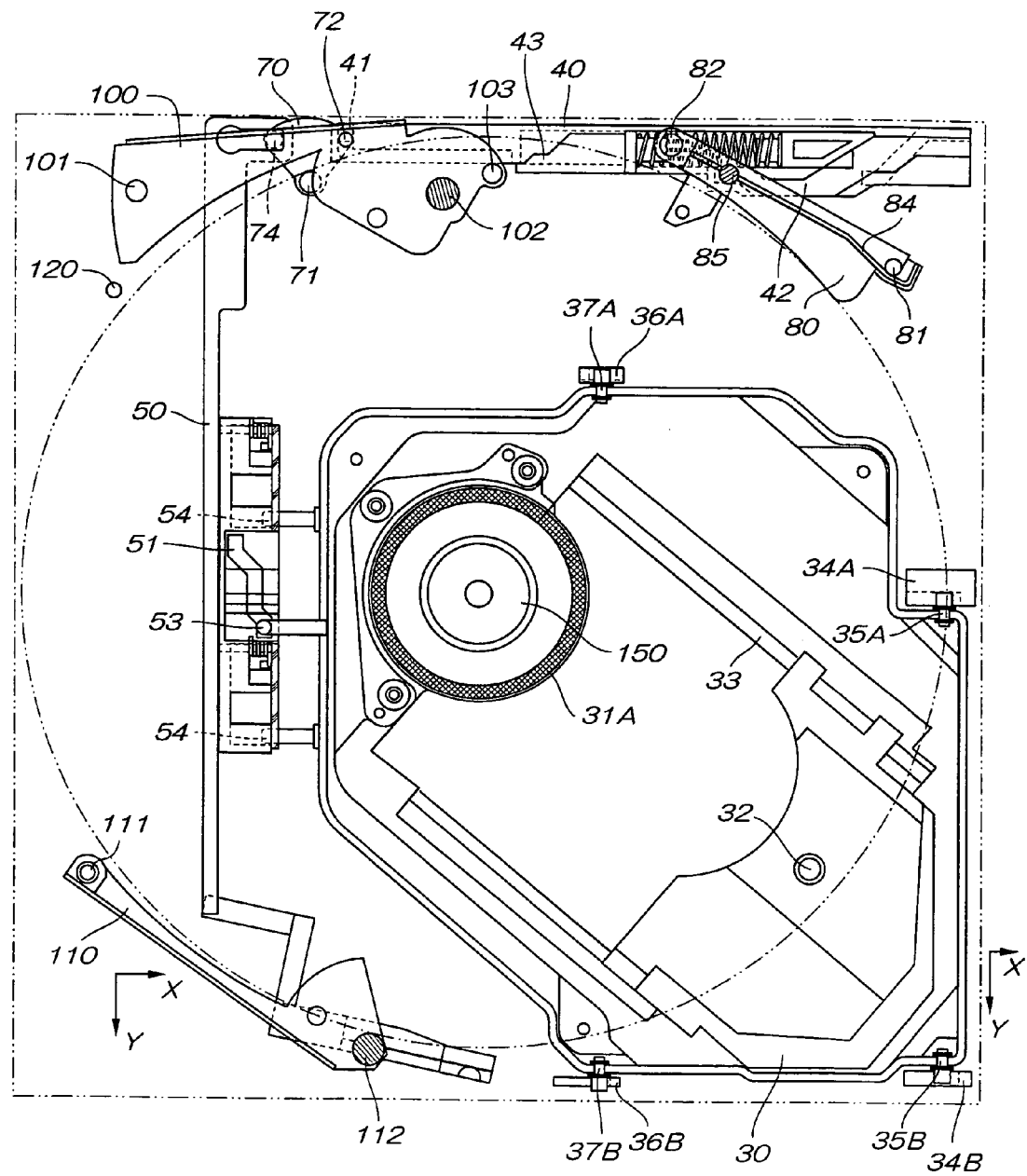
FIG. 36 is a plan view of an essential portion of the base body showing a state where a fourth predetermined time is elapsed from the state shown in FIG. 33 and a disk is recorded or replayed.
Figure 37:
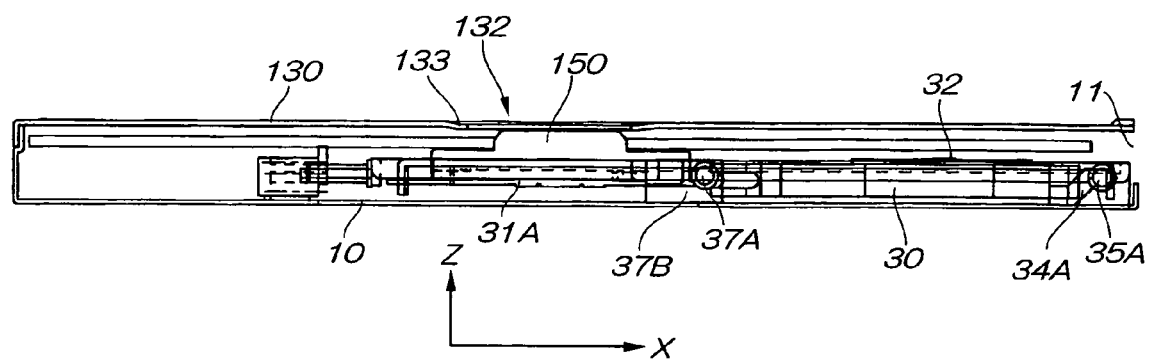
FIG. 37 is a side sectional view of an essential portion of this state.
Figure 38:
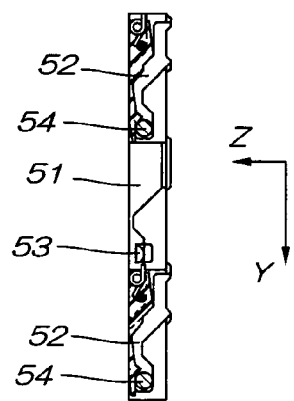
FIG. 38 is a side view of the sub-slider in this state.

FIG. 36 is a plan view of an essential portion of the base body showing a state where a fourth predetermined time is elapsed from the state shown in FIG. 10 and a disk is recorded or replayed. FIG. 37 is a side sectional view of an essential portion of this state. FIG. 38 is a side view of the sub-slider in this state.

In the loading completion state of the disk, as shown in FIGS. 24 to 26, the traverse 30 is disposed at the rearmost position closest to the base body 10.

That is, in this state, the slide pin 53 is located on one end (close to the main slider 40) of the slider cam mechanism 51. Therefore, the traverse 30 is disposed at a position close to the rearmost side. The cam pins 35A and 35B are located on the other ends of the grooves of the fixing cams 34A and 34B. Therefore, the other end (close to the pickup 32) of the traverse 30 is disposed at a position closest to the base body 10. The vertically moving pin 54 is located at one end (close to the main slider 40) of the vertically moving cam mechanism 52. Therefore, the one end (close to the spindle motor 31A) of the traverse 30 is disposed at a position closest to the base body 10.

The main slider 40 moves toward the disk inserting opening 11 from the state shown in FIG. 24, and with the movement of the main slider 40, the sub-slider 50 moves toward the main slider 40.

In a state where the chucking motion is carried out for the first predetermined time, as shown in FIGS. 27 to 29, the traverse 30 moves toward the disk inserting opening 11 by a first X axis distance, and the other end of the traverse 30 is disposed at a location away from the base body 10 by a first Y axis distance.

That is, in this state, the slide pin 53 moves the slider cam mechanism 51 by the first Y axis distance, and the traverse 30 moves toward the disk inserting opening 11 by the first X axis distance. Thus, the cam pins 35A and 35B move toward one ends of the grooves of the fixing cams 34A and 34B by the first X axis distance, and the other end (close to the pickup 32) of the traverse 30 is disposed at a location away from the base body 10 by a first Z axis distance. The vertically moving pin 54 moves from one end (close to the main slider 40) of the vertically moving cam mechanism 52 by the first Y axis distance. Since the grooves located in the range of the first Y axis distance have the same heights, the one end (close to the spindle motor 31A) of the traverse 30 is held at a position closest to the base body 10.

If the main slider 40 moves toward the disk inserting opening 11 from the state shown in FIG. 27, the sub-slider 50 further moves toward the main slider 40.

In a state where the chucking motion is further carried out for a second predetermined time from the state shown in FIG. 27, the other end of the traverse 30 is disposed at a location away from the base body 10 by a second Z axis distance (second z axis distance>first Z axis distance) as shown in FIGS. 30 to 32.

That is, in this state, the slide pin 53 moves the slider cam mechanism 51 by the second Y axis distance, but since the groove of the slider cam mechanism 51 is provided in parallel to the moving direction (Y axis direction) of the sub-slider 50 in this moving range, the traverse 30 does not move toward the disk inserting opening 11. Therefore, the cam pins 35A and 35B do not move in the grooves of the fixing cams 34A and 34B. The vertically moving pin 54 moves in the groove of the vertically moving cam mechanism 52 by the second Y axis distance, and moves the one end (close to the spindle motor 31A) of the traverse 30 from the base body 10 by the second Z axis distance.

If the main slider 40 moves toward the disk inserting opening 11 from the state shown in FIG. 30, the sub-slider 50 further moves toward the main slider 40.

In a state where the chucking motion is further carried out for a third predetermined time from the state shown in FIG. 30, the other end of the traverse 30 is disposed at a position of a third Z axis distance which is most separated from the base body 10 as shown in FIGS. 33 to 35.

That is, in this state, the slide pin 53 moves the slider cam mechanism 51 by a third Y axis distance, but since the groove of the slider cam mechanism 51 is provided in parallel to the moving direction (Y axis direction) of the sub-slider 50 in this moving range, the traverse 30 does not move toward the disk inserting opening 11. Therefore, the cam pins 35A and 35B do not move in the grooves of the fixing cams 34A and 34B. The vertically moving pin 54 moves in the groove of the vertically moving cam mechanism 52 by the third Y axis distance, and moves the one end (close to the spindle motor 31A) of the traverse 30 from the base body 10 by the third Z axis distance (highest position). In this state, the chucking of the disk by the hub body 150 is completed.

If the main slider 40 further moves toward the disk inserting opening 11 from the state shown in FIG. 33, the sub-slider 50 further moves toward the main slider 40.

As shown in FIGS. 36 to 38, the traverse 30 moves toward the disk inserting opening 11, the other end of the traverse 30 moves in a direction approaching the base body 10, and is disposed at a position of the first Z axis distance.

That is, in this state, the slide pin 53 moves the slider cam mechanism 51 by a fourth Y axis direction, and the traverse 30 moves toward the disk inserting opening 11 by the second Z axis distance. Therefore, the cam pins 35A and 35B move toward the one ends of the grooves of the fixing cams 34A and 34B by the second X axis distance, but the height of the other end (close to the pickup 32) of the traverse 30 is not varied. The vertically moving pin 54 moves in the groove of the vertically moving cam mechanism 52 by the fourth Y axis direction, moves the one end (close to the spindle motor 31A) of the traverse 30 toward the base body 10, and disposes the one end at a location of the first Z axis distance.

Through the above-described motion, the disk is separated from the lid 130 and also from the fixing pin 120, and the disk is brought into a replay/recording state.

The loaded disk is discharged by driving the loading motor and moving the main slider 40 toward its other end, and basically the above-described motion is carried out reversely.

According to the present invention, it is possible to reduce a disk apparatus in thickness and size.

Especially, according to the invention, the disk apparatus can be thinned by reducing the height space above a turntable required for inserting a disk in a standby state where no disk is inserted into the disk apparatus.

INDUSTRIAL APPLICABILITY

The chucking apparatus of the present invention is useful for a disk apparatus which is incorporated or integrally set in a so-called notebook personal computer integrally provided with display means, input means, calculating means and the like.

What is claimed is:

1. A chucking apparatus in which a plurality of pawl bodies are provided in a radial direction of a hub body of a turntable such that said pawl bodies can move, a center hole of a disk is pressed by said pawl bodies to hold said disk, wherein said chucking apparatus comprises a resilient member for biasing said pawl bodies outward of said hub body, each of said pawl bodies includes a pawl portion which comes into contact with said disk, and a pawl-side stopper for limiting outward movement of said pawl bodies caused by said resilient member, said hub body includes a pawl opening through which said pawl portion can project outward, and a hub-side stopper which abuts against said pawl-side stopper, and a position of said pawl portion in a standby state where said disk is not held by said pawl portion is set lower than a position of said pawl portion in a recording/replaying state where said disk is held by said pawl portion.

2. The chucking apparatus according to claim 1, wherein a coil spring is used as said resilient member, and an abutment position between said pawl-side stopper and said hub-side stopper is lower than a center line of said coil spring.

3. The chucking apparatus according to claim 2, wherein the abutment position between said pawl-side stopper and said hub-side stopper is provided on an inner side than said pawl portion.

4. The chucking apparatus according to claim 2, wherein said pawl-side stopper is provided on a side of said pawl portion.

5. The chucking apparatus according to claim 1, wherein a position of said pawl portion in a standby state where said disk is not held by said pawl portion is equal to or lower than a height of an upper surface of said hub.

6. The chucking apparatus according to claim 1, wherein a position of said pawl portion in a recording/replaying state where said disk is held by said pawl portion is higher than a height of an upper surface of said hub.

7. The chucking apparatus according to claim 1, wherein said pawl portion is moved outward and a position of said pawl portion becomes lower in a case where a thickness of said disk is thin in a recording/replaying state where said disk is held by said pawl portion, as compared with a case where said disk is thick.

8. The chucking apparatus according to claim 7, wherein an upward guide surface provided on a tip end side of said pawl portion and a downward receiving surface of said hub body provided at a position opposed to said upward guide surface are inclined such that their tip end sides are lower.

9. The chucking apparatus according to claim 7, wherein a downward guide surface is provided at a position lower than a tip end of said pawl portion, said hub body is provided with an upper receiving surface at a position opposed to said downward guide surface, said downward guide surface comprises at least a first inclined surface and a second inclined surface, if said pawl portion is pressed from above by said disk, said first inclined surface is a surface against which said upper receiving surface abuts when a tip end of said pawl portion is inserted into a center hole of said disk or before said tip end of said pawl portion is inserted into said center hole of said disk, said second inclined surface is a surface against which said upper receiving surface abuts after said tip end of said pawl portion is inserted into said center hole of said disk, an angle formed between said second inclined surface and a pressing direction is smaller than an angle formed between said first inclined surface and the pressing direction, and said downward guide surface slides along said upper receiving surface and said pawl portion moves inward by pressing said pawl portion from above.

10. The chucking apparatus according to claim 7, wherein a coil spring is used as said resilient member, an abutment position between said pawl-side stopper and said hub-side stopper is lower than a center line of said coil spring and is provided on the inner side than said pawl portion.

11. The chucking apparatus according to claim 1, wherein a lower end surface of said pawl body is of an arc shape.

12. The chucking apparatus according to claim 1, wherein an upper surface of said pawl portion in a recording/replaying state where said disk is held by said pawl portion is inclined such that a tip end side of said upper surface is higher with respect to a surface of said disk than the upper surface of said pawl portion in its standby state.

13. The chucking apparatus according to claim 12, wherein a tapered surface is provided on an inner side of said upper surface of said pawl portion, the tapered surface is inclined such that an inner side thereof is lower than a tip end side surface of said upper surface of said pawl portion, and said tapered surface is inclined such that its inner side is lower than a surface of said disk in the recording/replaying state where said disk is held by said pawl portion.

14. A disk apparatus using the chucking apparatus according to claim 1, wherein said disk apparatus comprises a chassis outer sheath including a base body and a lid, a front surface of said chassis outer sheath is formed with a disk inserting opening in which a disk is directly inserted, a traverse provided on said base body holds a spindle motor and a pickup, an upper surface of said spindle motor includes said turntable, and said traverse is moved toward and away from said base body.

15. A chucking apparatus in which a plurality of pawl bodies are provided in a radial direction of a hub body of a turntable such that said pawl bodies can move, a center hole of a disk is pressed by said pawl bodies to hold said disk, wherein said chucking apparatus comprises a resilient member for biasing said pawl bodies outward of said hub body, each of said pawl bodies includes a pawl portion which comes into contact with said disk, and a pawl-side stopper for limiting outward movement of said pawl bodies caused by said resilient member, said hub body includes a pawl opening through which said pawl portion can project outward, and a hub-side stopper which abuts against said pawl-side stopper, said pawl-side stopper which limits outward movement of said pawl body caused by said resilient member is provided closer to a tip end as compared with a contact portion between said pawl-side stopper and a lower end of said pawl body of a lower part in a standby state where said disk is not held by said pawl portion, and said hub-side stopper which abuts against said pawl-side stopper has an inclined surface whose lower side is close to a tip end side.

* * * * *